(12) United States Patent
Dubé-Cousineau (10) Patent No.: US 10,719,573 B2
(45) Date of Patent: Jul. 21, 2020

(54) SYSTEMS AND METHODS FOR RETRIEVING WEB DATA

(71) Applicant: FLINKS TECHNOLOGY INC., Montreal (CA)

(72) Inventor: Julien Dubé-Cousineau, Montreal (CA)

(73) Assignee: FLINKS TECHNOLOGY INC., Montreal (CA)

( * ) Notice: Subject to any disclaimer, the term of this patent is extended or adjusted under 35 U.S.C. 154(b) by 84 days.

(21) Appl. No.: 16/176,840

(22) Filed: Oct. 31, 2018

(65) Prior Publication Data

US 2020/0134098 A1 Apr. 30, 2020

(51) Int. Cl.
| | | |
|---|---|---|
| G06F 15/16 | (2006.01) | |
| G06F 16/958 | (2019.01) | |
| H04L 29/08 | (2006.01) | |
| G06F 40/14 | (2020.01) | |

(52) U.S. Cl.
CPC ............ *G06F 16/986* (2019.01); *G06F 40/14* (2020.01); *H04L 67/02* (2013.01); *G06F 2209/541* (2013.01)

(58) Field of Classification Search
USPC ....... 709/203, 206, 217, 219, 223, 224, 226, 709/228, 229, 230, 231, 232, 238; 711/136; 726/23
See application file for complete search history.

(56) References Cited

U.S. PATENT DOCUMENTS

| | | |
|---|---|---|
| 6,920,609 B1 | 7/2005 | Manber et al. |
| 7,020,667 B2 | 3/2006 | Guest et al. |
| 7,506,072 B2 | 3/2009 | Waldorf et al. |
| 7,555,480 B2 | 6/2009 | Zhang et al. |
| 7,672,938 B2 | 3/2010 | Hawkins |
| 7,765,236 B2 | 7/2010 | Zhai et al. |
| 8,010,544 B2 | 8/2011 | Tiyyagura |
| 8,117,203 B2 | 2/2012 | Gazen et al. |
| 8,219,473 B2 | 7/2012 | Gardner et al. |
| 8,285,813 B1 | 10/2012 | Colton et al. |
| 8,306,255 B1 | 11/2012 | Degnan |
| 8,381,098 B2 | 2/2013 | Hampton et al. |
| 8,589,366 B1 | 11/2013 | Younes et al. |
| 8,838,748 B2 | 9/2014 | Nair et al. |
| 9,009,334 B1 * | 4/2015 | Jenkins .................. G06F 21/55 709/229 |

(Continued)

OTHER PUBLICATIONS

Tseng, C-H., Virtual Browing Environment for Mashups, International Conference on Advances Information Technologies (AIT), Dec. 8, 2015.

(Continued)

*Primary Examiner* — Quang N Nguyen
(74) *Attorney, Agent, or Firm* — BCF LLP (57) ABSTRACT

Systems and methods for retrieving data of a web page are described herein. In one broad aspect, there is provided a method comprising: requesting the data of the web page from a browser application instance in accordance with a protocol capable of remotely instructing behavior of the browser application instance; in response to the requesting, receiving the data of the web page; instructing a server-side parser to retrieve at least one data item from the data of the web page; and transmitting the at least one data item to a requestor.

19 Claims, 7 Drawing Sheets

(56) References Cited

U.S. PATENT DOCUMENTS

| | | | |
|---|---|---|---|
| 9,076,182 B2 | 7/2015 | Chourasia et al. | |
| 9,152,970 B1* | 10/2015 | Trahan | G06Q 30/02 |
| 9,171,080 B2 | 10/2015 | Song et al. | |
| 9,524,351 B2 | 12/2016 | Dickens et al. | |
| 9,542,622 B2 | 1/2017 | Gulwani et al. | |
| 9,813,480 B2 | 11/2017 | Kolam et al. | |
| 9,870,349 B2 | 1/2018 | Wei et al. | |
| 2008/0098300 A1 | 4/2008 | Corrales et al. | |
| 2008/0270297 A1 | 10/2008 | McElroy et al. | |
| 2008/0288449 A1 | 11/2008 | Stinson | |
| 2009/0144359 A1* | 6/2009 | Karlsen | H04L 67/26 709/203 |
| 2010/0318745 A1* | 12/2010 | Wheeler | G06F 16/9574 711/136 |
| 2011/0047176 A1 | 2/2011 | Hoffman | |
| 2011/0167492 A1* | 7/2011 | Ghosh | G06F 9/54 726/23 |
| 2011/0191381 A1 | 8/2011 | Zheng et al. | |
| 2013/0346626 A1* | 12/2013 | Zhang | H04L 29/06027 709/231 |
| 2016/0232194 A1 | 8/2016 | Abraham et al. | |
| 2017/0046787 A1 | 2/2017 | Bothwell et al. | |
| 2017/0054961 A1* | 2/2017 | Belavy | H04N 21/8133 |
| 2017/0060981 A1 | 3/2017 | Ben-Tzur | |

OTHER PUBLICATIONS

Selenium, Selenium WebDriver, May 10, 2018, https://seleniumhq.org/docs/03.webdrivers.jsp.

Selenium, Test Design Considerations, May 10, 2018, https://www.seleniumhq.org/docs/06_testdesign_considerations.jsp.

W3C, WebDriver—W3C Proposed Recommendation, Apr. 26, 2018, http://www.w3.org/TR/2018/PR-webdriver-20180426/.

Selenium, The 5 Minute Getting Started Guide, Jun. 15, 2018, https://github.com/SeleniumHQ/selenium/wiki/Getting-Started.

* cited by examiner

SYSTEMS AND METHODS FOR RETRIEVING WEB DATA

FIELD

Embodiments of the servers and methods described herein relate generally to the retrieval of web page data, and more specifically, to servers and methods for retrieving data of a web page via a browser application instance remotely controlled by a server.

BACKGROUND

A web browser (often referred to simply as a browser, for short) is a software application for accessing web pages on the World Wide Web. Popular web browsers currently include Google Chrome, Mozilla Firefox, Internet Explorer, and Safari, to name a few. Typically, a user will access information on a web page by navigating to a Uniform Resource Locator (URL) associated with the web page, using the web browser. The browser causes data of the web page to be retrieved, which data may then be displayed to the user on his or her computing device. This browser is an example of a user agent—software that acts on behalf of a user.

In particular, where the URL begins with "http:" or "https:" the browser will typically retrieve data of the associated web page in accordance with the Hypertext Transfer Protocol (HTTP). HTTP is an application protocol for exchanging or transferring hypertext—structured text that contains logical links, known as hyperlinks, to text in documents residing on different network nodes. HTTP functions as a request-response protocol in client-server communications: a client (e.g., a web browser) can submit an HTTP request message to a server (e.g., an application executing on a web server that hosts a web page of interest) to request certain resources provided by the server such as a Hypertext Markup Language (HTML) file or other content; the server can then return to the client a response message that may include, for example, the requested content. This content may potentially be displayable on the user's computing device, typically using a rendering engine of the browser. Moreover, while this content typically comprises text, it may, additionally or alternatively, include images and video in such formats as may be supported by the particular browser.

SUMMARY

In one broad aspect, there is provided a computer-implemented server for retrieving data of a web page, wherein the web page is retrievable by a browser application instance executable on at least one computing device, wherein the server comprises: at least one memory for storing a plurality of instructions, and; at least one processor for executing the plurality of instructions to cause a method for retrieving data of the web page to be performed, the method comprising: requesting, from the at least one computing device, the data of the web page in accordance with a protocol capable of remotely instructing behavior of the browser application instance; in response to the requesting, receiving the data of the web page; instructing a server-side parser remote from the browser application instance, to retrieve at least one data item from the data of the web page; and transmitting the at least one data item to a requestor.

In at least one embodiment, the at least one computing device is communicatively couplable to the server via at least one network connection.

In at least one embodiment, the protocol capable of remotely instructing behavior of the browser application instance is provided by a browser remote control interface.

In at least one embodiment, the browser remote control interface comprises a WebDriver interface.

In at least one embodiment, the requesting comprises transmitting, to the at least one computing device, at least one WebDriver protocol command for controlling the browser application instance.

In at least one embodiment, the at least one WebDriver protocol command comprises a plurality of Hypertext Transfer Protocol (HTTP) commands.

In at least one embodiment, the at least one computing device on which the browser application instance is executable comprises a hub, and the hub is configurable to control a plurality of browser application instances.

In at least one embodiment, the web page comprises a file in a HyperText Markup Language (HTML) format.

In at least one embodiment, the data of the web page comprises the file in its entirety.

In at least one embodiment, the file comprises a plurality of Document Object Model (DOM) elements, and the data of the web page is associated with a subset of the plurality of DOM elements.

In at least one embodiment, the server-side parser is implemented on a same physical device as the server.

In at least one embodiment, the server-side parser resides on a device communicatively coupled to the server.

In at least one embodiment, the web page comprises data associated with at least one financial account.

In at least one embodiment, the web page comprises the data associated with the at least one financial account, represented in a summary format.

In at least one embodiment, the method further comprises receiving an account verification request from the requestor, and the at least one data item is usable to perform at least one account verification task for the at least one financial account.

In at least one embodiment, the method further comprises receiving a transaction history request from the requestor, and the at least one data item comprises transactional data for the at least one financial account.

In at least one embodiment, the method further comprises receiving a customer information request from the requestor, and the at least one data item comprises one or both of: data associated with the at least one financial account, and data associated with an owner of the at least one financial account.

In another broad aspect, there is provided a method of retrieving data of a web page, wherein the web page is retrievable by a browser application instance executable on at least one computing device, wherein the server comprises at least one memory for storing a plurality of instructions, and at least one processor for executing the plurality of instructions to cause the method to be performed, the method comprising: requesting, from the at least one computing device, the data of the web page in accordance with a protocol capable of remotely instructing behavior of the browser application instance; in response to the requesting, receiving the data of the web page; instructing a server-side parser remote from the browser application instance, to retrieve at least one data item from the data of the web page; and transmitting the at least one data item to a requestor.

In another broad aspect, there is provided a non-transitory computer-readable medium storing instructions that, when executed by at least one processor, cause a method for retrieving data of a web page to be performed, the method comprising: requesting, from at least one computing device, the data of the web page in accordance with a protocol capable of remotely instructing behavior of a browser application instance that is executable on the at least one computing device; in response to the requesting, receiving the data of the web page; instructing a parser remote from the browser application instance, to retrieve at least one data item from the data of the web page; and transmitting the at least one data item to a requestor.

Additional and/or alternative features, aspects and advantages of implementations of the present technology will become apparent from the following description, the accompanying drawings, and the appended claims.

BRIEF DESCRIPTION OF THE DRAWINGS

For a better understanding of the embodiments described herein, and to show more clearly how they may be carried into effect, reference will now be made, by way of example, to the accompanying drawings in which.

It should be noted that, unless otherwise explicitly specified herein, the drawings are not to scale.

DESCRIPTION OF EXAMPLE EMBODIMENTS

Although it is common for human users to manually interact with web browsers when navigating to web pages of interest in order to access or consume web content, web browser automation tools and frameworks are also known in the art. These browser automation tools and frameworks may, at least in part, address the fact that certain tasks, which would otherwise be performed by human users when interacting with web pages, are repetitive or tedious in nature. By way of illustration, repeatable tasks in website testing, form populating, web scraping, data extraction and transfer, and report generation can potentially benefit from browser automation. In one example aspect, certain browser automation tools may, in operation, attempt to mimic how a human user would interact with a web browser, in order to automate repetitive tasks.

Selenium WebDriver ("WebDriver") is one example of a browser automation tool that is primarily used to test web applications, but which may also be used to automate other web-based tasks. WebDriver is purported to provide a platform-neutral and language-neutral wire protocol as a way for out-of-process programs to remotely instruct the behavior of web browsers. In addition, there is provided a set of interfaces to discover and manipulate Document Object Model (DOM) elements in web documents and to control the behavior of user agents, including web browsers.

In one example WebDriver application, data associated with a financial account may be retrieved in order to satisfy a request for such data by a requestor, which may be, for instance, a financial management application. This data may be retrieved with little to no manual user intervention (i.e., "scraped") from a web page made accessible by a web server and that is operated by a financial institution responsible for maintaining the financial account.

Figure 1:
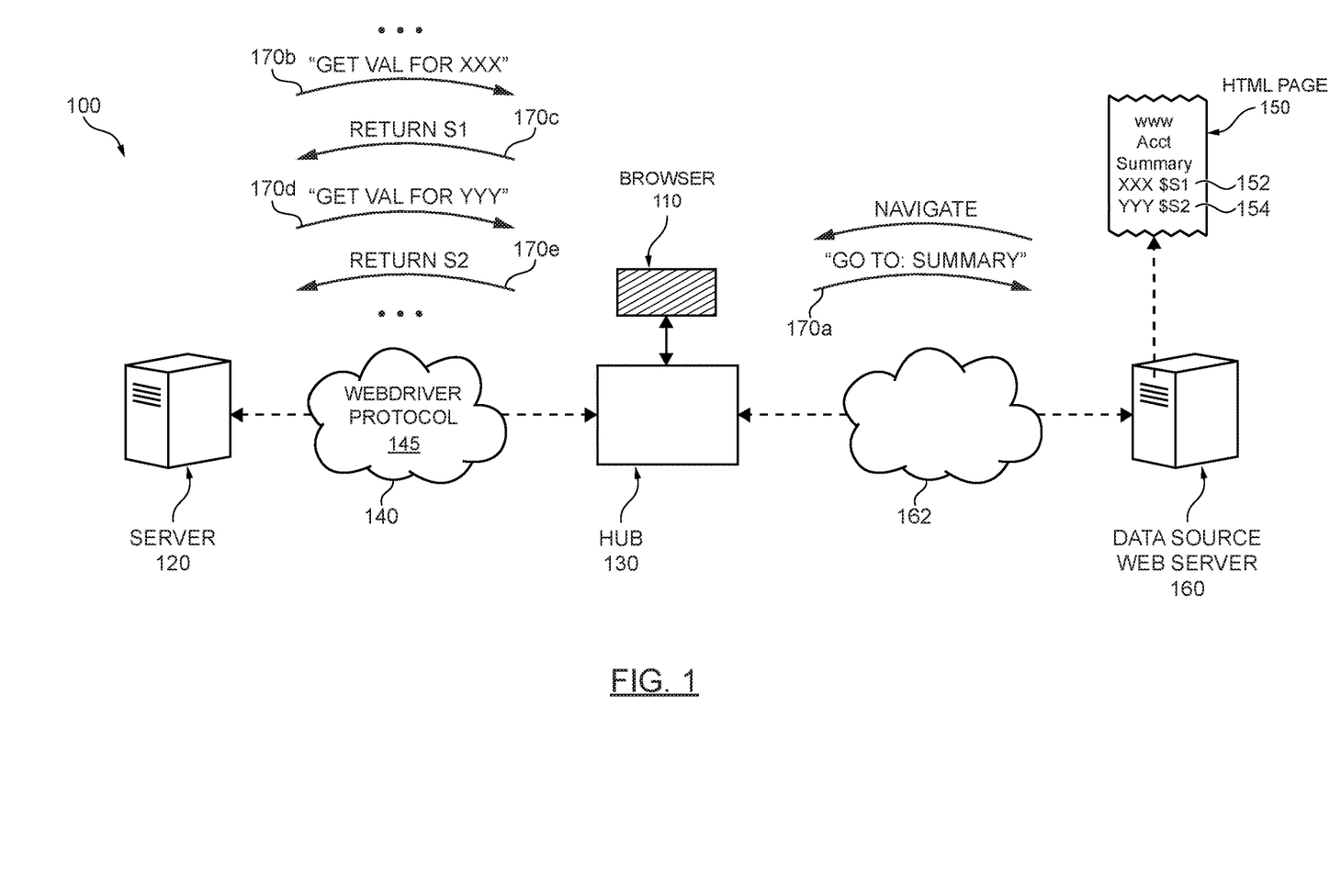
FIG. 1 is a block diagram illustrating components of a system in which the operation of a web browser has been automated, in accordance with one example configuration.

For instance, FIG. 1 is a block diagram of a system, shown generally as 100, that illustrates how data associated with one or more financial accounts of a given user may be automatically retrieved (i.e., without manual intervention by that user). In the configuration shown, remote control of a browser 110 is driven by a server 120 that has initiated a request for data associated with one or more of the user's financial accounts. This request for data may, itself, have been made in response to a request received at server 120 and originating from a third-party application (i.e., from a "requestor", not explicitly shown in FIG. 1), such as a financial management application. In order to retrieve the desired data via browser 110, server 120 establishes communication with a hub 130 over a network 140 that communicatively couples server 120 with hub 130. In this configuration, browser 110 is an instance of a browser application that executes on hub 130.

In operation, server 120 establishes communication with hub 130 to remotely control browser 110 in accordance with a WebDriver protocol 145. As previously described, WebDriver protocol 145 provides a set of interfaces to discover and manipulate DOM elements in web documents, such as an HTML page 150 hosted by a data source web server ("web server") 160. Computer-executable code is stored at server 120 that implements automated data retrieval via browser 110. The data to be retrieved is made available by web server 160 via one or more web pages (e.g., HTML page 150) upon access by, or otherwise at the request of, browser 110.

By way of example, a requested HTML page 150 may be a "summary" web page of financial account data for the user, which may contain information such as account balances, account numbers, account types, overdraft amounts, and other account information associated with the user. In FIG. 1, two example data items 152, 154 representing dollar values "S1" and "S2", respectively, on requested HTML page 150 are shown.

In an example operational sequence, once communication between browser 110 on hub 130 and server 120 is established, in accordance with WebDriver protocol 145, browser 110 receives a "GoTo" command 170a that triggers a request that is transmitted to web server 160 via a network 162 (e.g., the Internet), to navigate to HTML page 150 representing a summary of financial account data. Assuming HTML page 150 with data items 152, 154 has been successfully accessed and loaded into browser 110, a first request command 170b is received from server 120 by browser 110 to retrieve the balance for account "XXX", an operation which may require locating the text value stored in a corresponding DOM element of HTML page 150 (e.g., by locating a corresponding anchor in known manner); in response, the value of "S1" (152) is retrieved from the loaded HTML page 150, by browser 110, at 170c. In the same manner, a second request command 170d is received from server 120 by browser 110 to retrieve the balance for account "YYY"; in response, the value of "S2" (154) is retrieved from the loaded HTML page 150, by browser 110, at 170e. Values S1 and S2 (e.g., data items 152, 154) are returned to server 120 for use in further processing, which may include, for example, communicating these values as account balances to the original requestor, such as a financial management application.

Notably, WebDriver protocol 145 is organized into commands. A single HTTP request represents a single command, and each command produces a single HTTP response. A series of actions are run against a browser (e.g., browser 110 of FIG. 1) in response to a command, in accordance with a WebDriver specification (e.g., "WebDriver: W3C Recommendation 5 Jun. 2018", the contents of which are herein incorporated by reference). When the retrieval of values for multiple data items (e.g. data items 152, 154 of FIG. 1) of a web page (e.g., HTML page 150 of FIG. 1) is desired, conventionally, each value is retrieved sequentially through individual corresponding commands. Unfortunately, when there are numerous values to be retrieved from the web page (e.g., in situations where data corresponding to hundreds or thousands of historical transactions are to be retrieved), there may be a correspondingly large number of network HTTP commands and responses. Collectively, the multiplicity of exchanges of HTTP commands and responses can introduce significant delays in a data retrieval process. Moreover, if there is some expectation (e.g., by a data requestor) that data retrieval will occur substantially in real-time, these delays may severely and adversely impact usability (e.g., of the financial management application).

Accordingly, in at least some embodiments described herein, a process of automating data retrieval using a protocol capable of remotely controlling browser application instances is improved by requesting a web page in its entirety (e.g., a complete HTML page), or substantially in its entirety, and returning that web page to a server (e.g., via a network connection) to be processed by a server-side parser. In operation, the server-side parser, rather than the browser application instance via remote control, retrieves the individual, desired data items from the web page. The server-side parser can then provide the retrieved data items for use in further processing, which may include, for example, communicating some or all of the retrieved data to the original requestor, such as a financial management application.

Use of the server-side parser described herein in various embodiments may, for example, minimize the number of HTTP calls, as well as potentially bandwidth where HTTP commands and responses are communicated over a network connection. Applicants recognized the potential to trade off the costs of retrieving an entire HTML page from a browser application instance to parse out individual data items, with the costs of retrieving individual data items from the browser application instance via remote control (e.g., using WebDriver protocol); the greater the number of data items that need to be retrieved from a given web page, the more time-consuming conventional data retrieval methods using a protocol for remotely controlling browser application instances can be.

Figure 2:
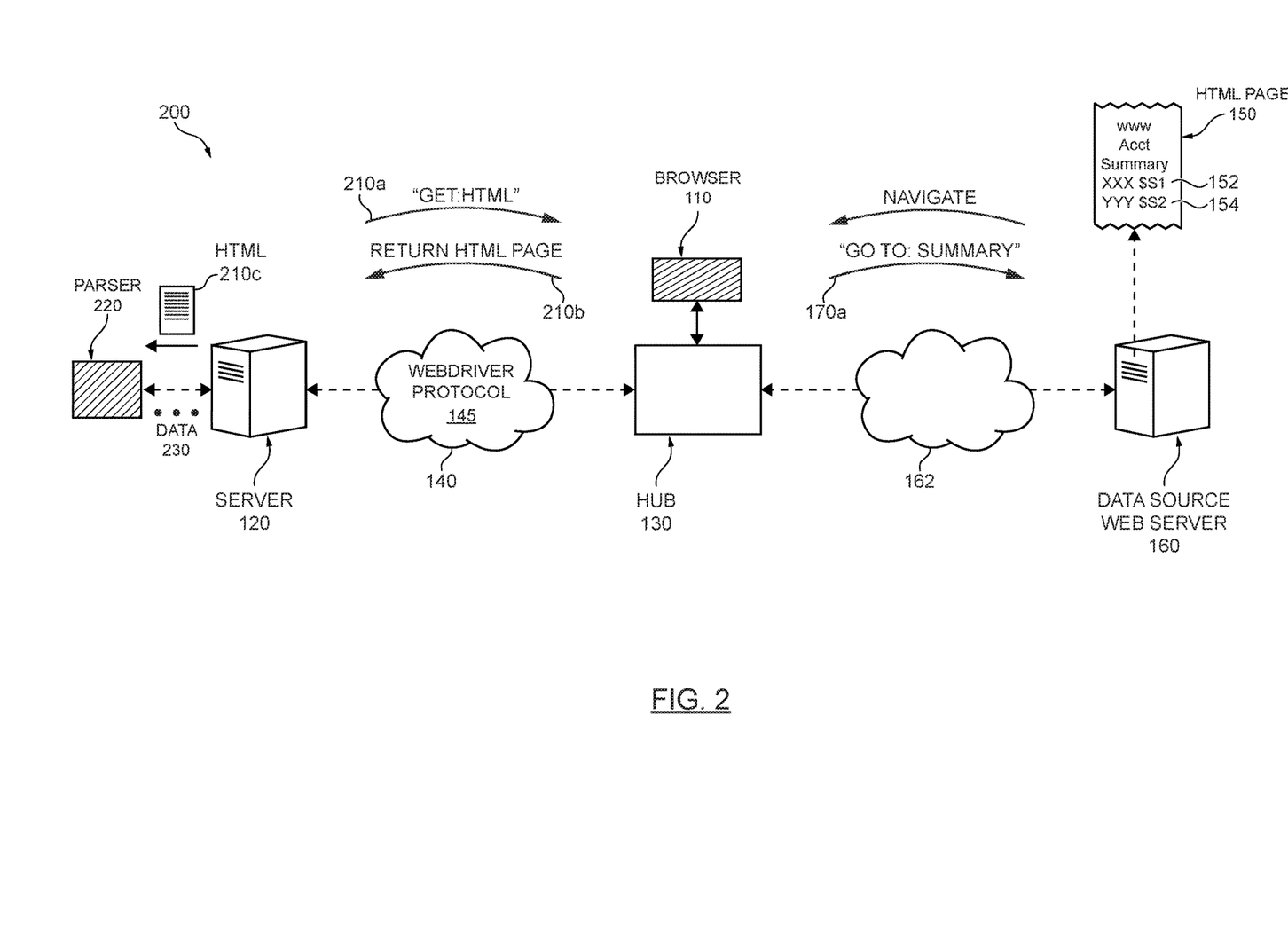
FIG. 2 is a block diagram illustrating components of a system in which the operation of a web browser is automated, and which includes a server-side parser, in accordance with at least one embodiment.

Referring now to FIG. 2, a block diagram of a system that illustrates how data associated with one or more financial accounts of a given user is automatically retrieved (i.e., without manual intervention by that user) in accordance with at least one example embodiment is shown generally as 200.

Although the examples provided herein are described primarily with reference to data associated with financial accounts, other data may be processed in variant implementations of the embodiments described. Sources of other types of data where the retrieval of data items needs to be done at a significantly increased speed (e.g., to facilitate real-time processing) may benefit from the methods described herein.

In the illustrated configuration, certain elements of FIG. 2 have already been described with reference to FIG. 1, and the reader is directed to the description of FIG. 1 for additional detail. For example, remote control of a browser application instance, browser 110, remains driven by server 120, which has initiated a request for data associated with one or more of the user's financial accounts. Browser 110 is executable on at least one computing device, which in at least one embodiment comprises a hub (e.g., hub 130), configurable to control a plurality of browser application instances. However, in general, browser 110 need not reside on the same physical device as hub 130 but may reside on a different physical device communicatively coupled to hub 130.

Furthermore, the use of a hub to control multiple browser application instances may allow for increased scalability; however, in variant embodiments system 200 may not utilize a hub at all, and the functionality of browser 110 may be provided by one or more different computing devices. In variant embodiments, browser 110 may comprise a virtual browser. In variant embodiments, browser 110, while still controlled using a protocol for remotely controlling browser application instances, may reside on the same physical device as server 120.

Continuing with the example of FIG. 2, the at least one computing device (e.g., hub 130 in certain embodiments), upon which browser 110 is executable, is communicatively couplable to server 120 via at least one network connection represented generally by network 140 in FIG. 2. Server 120 is capable of requesting, from the at least one computing device, the data of a web page (e.g., HTML page 150) that has been made accessible by a web server (e.g., data source web server 160) via network 162. The request is made in accordance with a protocol capable of remotely instructing behavior of the browser application instance, browser 110. In at least one embodiment, the protocol (e.g., WebDriver protocol 145) is provided by a browser remote control interface. For example, the browser remote control interface may comprise a WebDriver interface. In that example embodiment, when server 120 requests the data of the web page (e.g., HTML page 150), at least one WebDriver protocol command for controlling the browser application interface is transmitted to the at least one computing device (e.g., hub 130). The at least one WebDriver protocol command may comprise a plurality of HTTP commands.

With respect to server 120 of system 200, server 120 comprises at least one memory for storing a plurality of instructions, and at least one processor for executing the plurality of instructions to cause a method for retrieving data of a web page to be performed, as described herein with reference to a number of example aspects, embodiments, and implementations. Generally, the functionality of a "server" can be implemented by a computer program running on appropriate hardware that is capable of receiving requests (e.g., from client devices) over a network, and carrying out those requests, or causing those requests to be carried out. The hardware may be, for example, one physical computing device, or one physical computer system comprising multiple computing devices, in varying implementations. In some implementations, a bank of multiple computing devices may be used to implement the functions of the server, for load-balancing purposes as an example. Moreover, the use of the expression "server" is not intended to mean that every task (e.g., received instructions or requests) or any particular task will have been received, carried out, or caused to be carried out, by a particular software, hardware, or software-hardware combination; it is intended to mean that any number of software elements and/or hardware devices may be involved in receiving, sending, carrying out, and/or causing to be carried out any task or request, or the consequences of any task or request.

For comparison purposes, consider the example operational sequence described earlier with reference to FIG. 1; there, once communication between browser 110 on hub 130 and server 120 was established, in accordance with WebDriver protocol 145, browser 110 could emit a "GoTo" command 170a to web server 160, in order to request access to HTML page 150 representing a summary of financial account data. Assuming HTML page 150 with data items 152, 154 was successfully retrieved and loaded, a sequence of request commands for individual data items in accordance with WebDriver protocol 145 would then be issued to browser 110.

In contrast to system 100 of FIG. 1, however, in at least one embodiment described with reference to system 200 of FIG. 2, a command 210a is transmitted to browser 110 to retrieve the data of a web page, comprising a file in HTML format (e.g., HTML page 150); in response, at 210b the entirety of the web page, for example the HTML file itself, is returned by browser 110 to, as noted and described further below, a server-side parser 220. In particular, in the example shown in FIG. 2, data values 152, 154 for "S1" and "S2" are not individually requested as they were in system 100, but rather those values will be encoded within the HTML file returned at 210b. In at least one embodiment, the web page (e.g., HTML page 150) comprises data associated with at least one financial account. In at least one embodiment, the requested web page may comprise data represented in a summary format.

The entirety of the web page may be returned by browser 110 to the server-side parser 220 in response to command 210a; however, persons skilled in the art will understand that certain modifications of the data returned by browser 110 may be made before and/or during transmission of the data to the server-side parser and/or server 120. For example, the returned data may be compressed and/or encrypted. As a further example, certain data may be filtered out or otherwise removed (e.g., message headers, metadata, etc.) and/or added (e.g., routing data, etc.) to facilitate further processing; data may be removed and/or added to facilitate user and/or device authentication.

In variant embodiments, the HTML file returned at 210b in response to request 210a is not the entirety of the file, but a specified subset of the data of HTML page 150. For example, where HTML page 150 comprises a plurality of DOM elements, the data of HTML page 150 returned at 210b may be associated with a specific subset of the plurality of DOM elements. In one example implementation, the subset represents data corresponding to a particular HTML table within HTML page 150, potentially presenting data for financial transactions in tabular form.

Continuing with the example of FIG. 2, the HTML data returned at 210b may be subsequently transmitted back to server 120, from browser 110 at hub 130, via network 140 in accordance with the WebDriver protocol 145. In accordance with at least one embodiment, the HTML data is transmitted (e.g., by server 120) to a parser 220. Parser 220 may be identified as "local" or "server-side" herein, in that parser 220 performs its parsing functions remotely from browser 110. Rather than communicating with browser 110 in order to retrieve individual data items of a web page using WebDriver protocol 145 or other remote control protocol, a batch of web page data is instead retrieved from browser 110 to be subsequently parsed into individual data items by parser 220.

In this manner, the retrieval of individual data items from the web page is done more proximate to server 120 than browser 110, which will typically (although not necessarily in all implementations) reside on a different physical device and/or be separated by at least one network connection. This approach may be considered somewhat counter-intuitive compared to some conventional web page data retrieval techniques where remote control protocols are utilized; however, Applicants' systems and methods can represent a significant improvement over such techniques, particularly when requested data can comprise many items of interest (e.g., long listings of individual financial transaction data items) which would otherwise require numerous HTTP calls be made to the browser, and where real-time responsiveness to data requests may be expected, enhance usability, and/or be more critical.

Furthermore, if the web page from which data is to be retrieved may become less accessible or inaccessible in some way (e.g., appearance of a time-out window while scrolling through a transactions list), retrieving the web page in its entirety at one point in time for subsequent processing by a server-side parser may alleviate or eliminate such inconveniences or issues.

Referring back to FIG. 2, parser 220 extracts or otherwise retrieves at least one data item 230 of interest from the data of the web page received at 210c. For example, parser 220 may extract original data values 152, 154 of HTML page 150 from the data received at 210c. In one embodiment, parser 220 comprises an eXtensible Markup Language (XML) parser. Data values provided by parser 220 can then be returned to server 120 for use in further processing, which may include, for example, communicating these values and/or providing some other information based on these values, to the original requestor such as a financial management application.

In one embodiment, parser 120 is implemented at the server 120. For example, at least one processor of server 120 may execute computer-readable instructions to provide the functionality of parser 220. In a variant embodiment, parser 220 resides on at least one device separate from, and communicatively coupled, to server 120 (e.g., to enhance scalability of the system). Parser 220 may be implemented on a "cloud"-based device in some implementations.

In at least one embodiment, in operation, server 120 may receive an account verification request from the requestor, and at least one data item retrieved by parser 220 is usable to perform at least one account verification task for the at least one financial account. The account verification request may be a real-time account verification request.

In at least one embodiment, in operation, server 120 may receive a transaction history request from the requestor, and at least one data item retrieved by parser 220 comprises transactional data for the at least one financial account. The transaction history request may be a real-time transaction history request.

In at least one embodiment, in operation, server 120 may receive a customer information request from the requestor, and at least one data item retrieved by parser 220 comprises data associated with the at least one financial account and/or data associated with an owner of the at least one financial account. The customer information request may be a real-time customer information request.

In variant embodiments, the systems and methods described herein may be employed to retrieve data through an application programming interface, to facilitate more efficient retrieval of individual, desired data items as part of an extract, transform, and load (ETL) process.

To further illustrate a number of aspects of the embodiments described herein, flowcharts of methods depicted in FIGS. 3A through 3D are provided, with additional details in respect of at least one example implementation. In one or more embodiments, the methods described, or one or more acts thereof, may be performed by one or more computing systems (e.g. computing system 400 of FIG. 4), and in particular, one or more processors thereof. For example, portions of any of the methods described herein may be performed by components of computing system 400, which may function as a server. Any of the methods described herein, or one or more acts thereof, may be embodied in computer-executable instructions that are stored on a computer-readable medium, such as a non-transitory computer-readable medium. It will be understood by persons skilled in the art that some acts or portions thereof in the flow diagrams may be omitted or changed in order, in variant implementations.

Figure 3A:
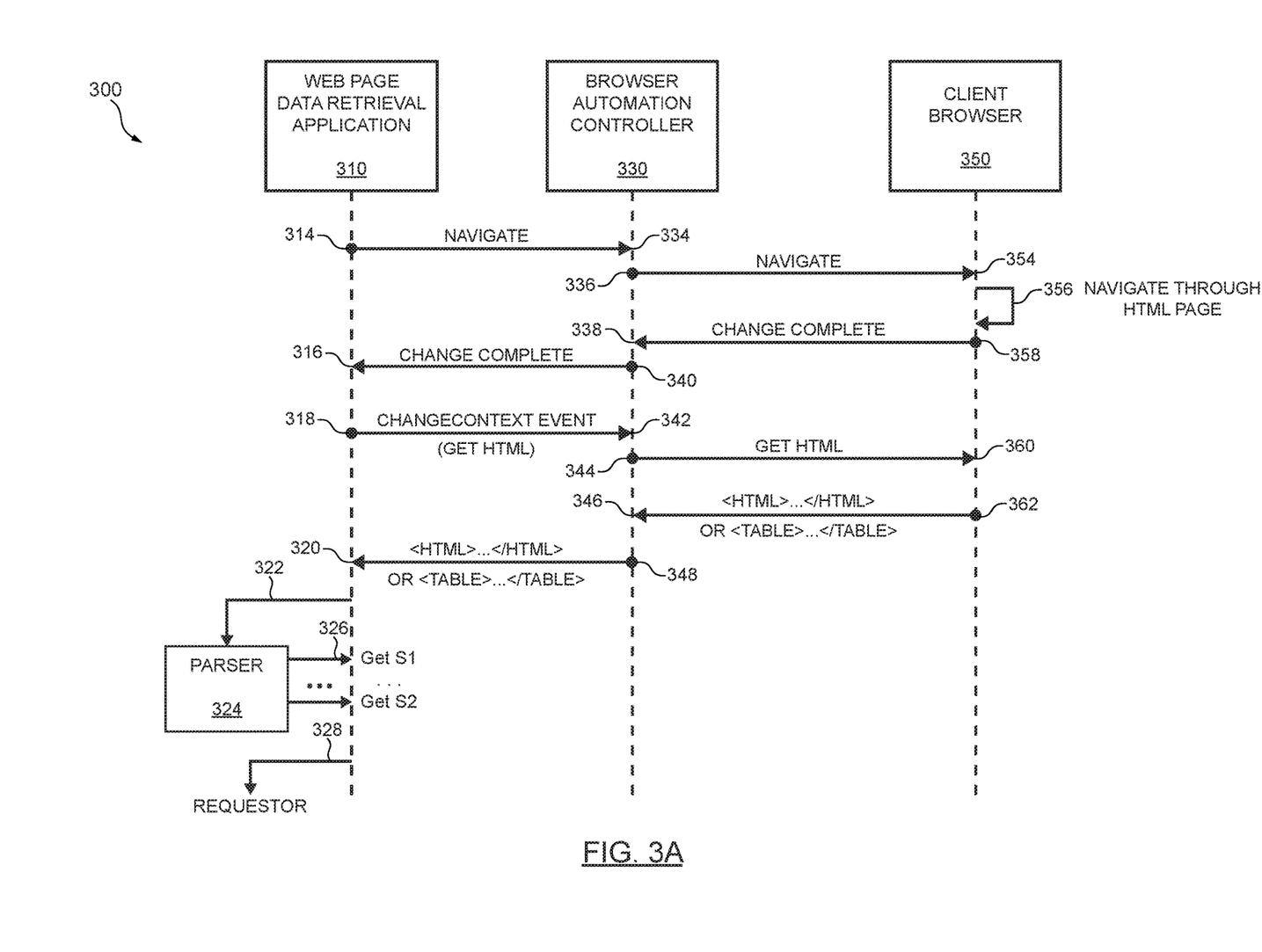
FIG. 3A is a flowchart diagram illustrating acts performed by a number of components, residing on a number of computing devices that may be depicted in FIG. 2, in respect of at least one embodiment.

FIG. 3A is a flowchart diagram illustrating acts performed by a number of components in respect of at least one embodiment, including a web page data retrieval application 310 ("application"), a parser 324, a browser automation controller 330 ("controller"), and a client browser 350 ("browser"). These components reside on computing devices, some of which may have been depicted in, and described earlier with reference to, FIG. 2. Additional details of the acts depicted in FIG. 3A are now provided with reference to FIGS. 3B through 3D.

Figure 3B:
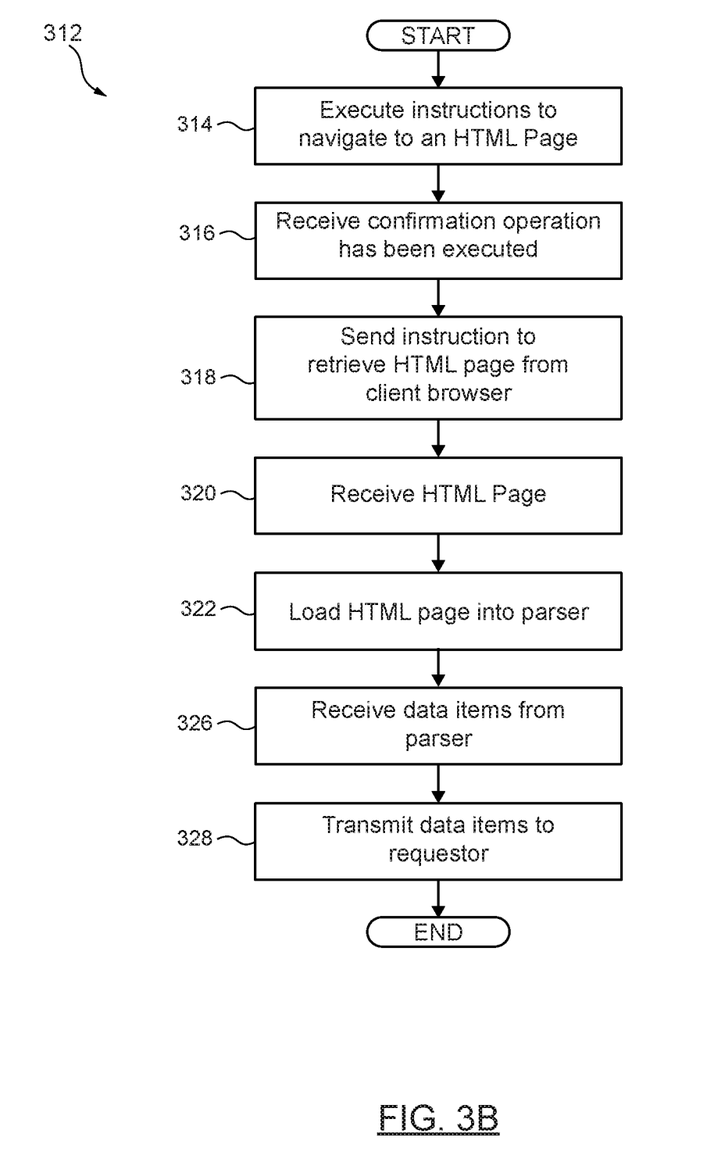
FIG. 3B is a flowchart diagram illustrating acts of a method for retrieving data of a web page in at least one embodiment.

FIG. 3B is a flowchart diagram illustrating acts of a method 312 for retrieving data of a web page in at least one embodiment. Instructions for executing acts of method 312 are embodied in application 310 (FIG. 3A) as code, for execution by server 120 of FIG. 2, in at least one embodiment. In operation, application 310 communicates with controller 330 (FIG. 3A) to control an instance of a browser application, depicted in FIG. 3A as client browser 350.

At 314, instructions of application 310 are executed to initiate a request that browser 350 navigate to a web page. In requesting that browser 350 navigate to the web page, instructions are transmitted to controller 330; in at least one embodiment, the transmission is made over at least one network connection (e.g., network 140 of FIG. 2) in accordance with a protocol capable of remotely instructing the behavior of browser 350 (e.g., WebDriver protocol 145 of FIG. 2). The transmitted instructions may comprise executable JavaScript code (or code in some other language supported by the protocol), an HTTP Redirect, or some other command to change the state of the web page. In this manner, navigation from one page context to another can be facilitated; a page context can be, for example, a popup in a page, an HTML fragment, or a new web page that is loaded upon a redirection.

The web page to which navigation is desired may be, for example, an HTML page. As previously noted, for example, the HTML page may be a "summary" page of financial data. In another example, the HTML page may comprise data relating a user's transaction history. Other examples have been described herein, and persons skilled in the art will appreciate that other implementations of embodiments described herein are possible.

The instructions executed at 314 to navigate to the web page may be in response to an explicit request (act not explicitly shown in the Figures) by a requestor (e.g., a financial management application) for data of the web page.

At 316, confirmation that the web page has been successfully navigated to may be received from controller 330, by application 310. If satisfactory confirmation is received (e.g., "OK"), the flow of method acts may proceed to 318.

At 318, an instruction is sent to retrieve all data of the HTML page (e.g., the entire HTML file) to which navigation was requested at 314, from browser 350. In one example implementation, this may be executed via a "ChangeContext" event, which causes an instruction to obtain the HTML page from browser 350 to be sent to controller 330. In variant embodiments, instructions to retrieve a specified portion of the HTML page (e.g., data stored in one or more specified HTML tables), rather than all data of the HTML page, may be sent at 318.

At 320, the data for which retrieval was instructed at 318 is received by application 310, and may be loaded into application memory.

At 322, the data received at 320 is transmitted to or otherwise accessed by parser 324. Certain aspects of parser 324 have been previously described with reference to parser 220 of FIG. 2, and the reader is directed to the description of FIG. 2 for additional detail on parser 220/324. The functionality of parser 324 may be provided by a separate application on the same computing device (e.g., server 120 of FIG. 2) as application 310, by a separate application on a different device, or by application 310 itself, depending upon implementation. Persons skilled in the art will appreciate that various configurations are possible.

At 326, application 310 retrieves data items of the web page through parser 324, rather than requesting the individual data items from browser 350 using a protocol for remote control thereof. For illustrative purposes, with reference to the example described with reference to FIGS. 1 and 2, the parsed elements retrieved at 326 may comprise data values "S1" (152) and "S2" (154) of HTML page 150.

At 328, the retrieved data items at 326 may be forward to a requestor. This may be, for example, a financial management application.

Figure 3C:
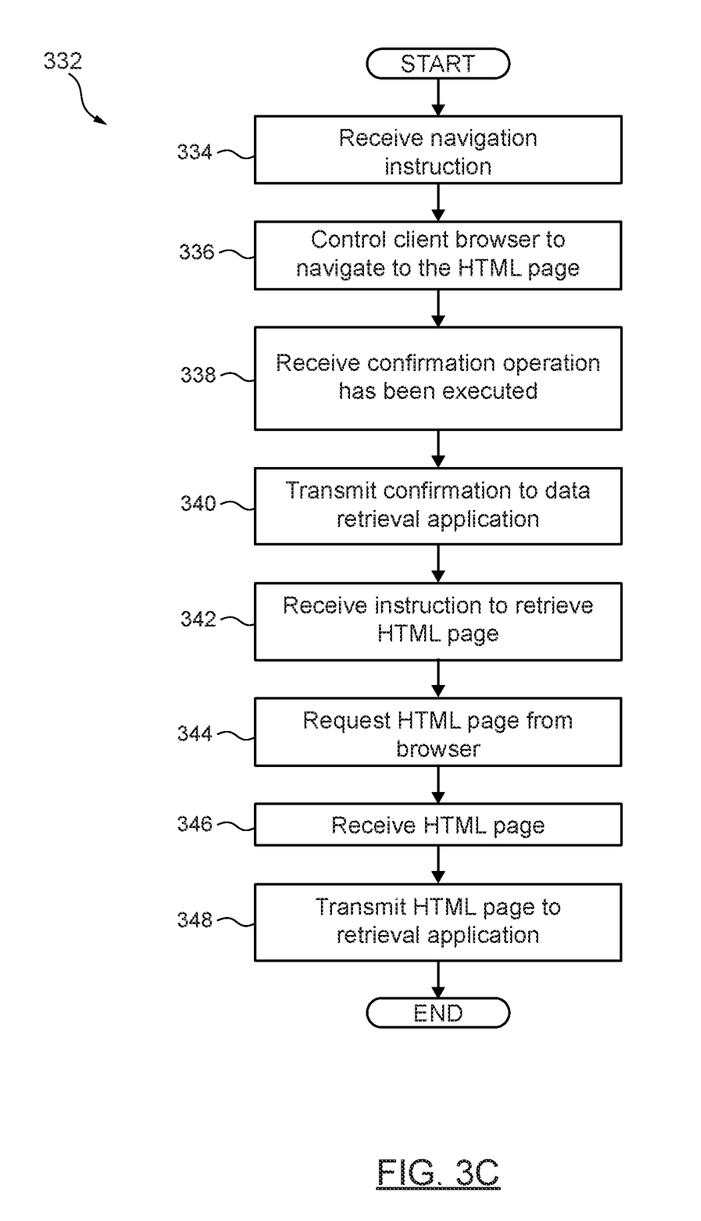
FIG. 3C is a flowchart diagram illustrating acts of a method for retrieving data of a web page in at least one embodiment.

FIG. 3C is a flowchart diagram illustrating acts of a method 332 for retrieving data of a web page in at least one embodiment. Instructions for executing acts of method 332 are embodied in code executed by controller 330 (FIG. 3A), which may reside and be executable on a hub (e.g. hub 130 of FIG. 2), in at least one embodiment. In operation, controller 330 communicates with application 310 (FIG. 3A) to control an instance of a browser application, depicted in FIG. 3A as client browser 350.

At 334, instructions are received from application 310 (e.g., see 314 of FIG. 3B) requesting that browser 350 navigate to a web page. In at least one embodiment, the navigation instruction is received over at least one network connection (e.g., network 140 of FIG. 2) in accordance with a protocol capable of remotely instructing the behavior of browser 350 (e.g., WebDriver protocol 145 of FIG. 2). As noted with reference to method 310 of FIG. 3B, the received instructions may comprise executable JavaScript code (or code in some other language supported by the protocol), an HTTP Redirect, or some other command to change the state of the web page, which may be an HTML page.

At 336, controller 330 controls browser 350 to navigate to the HTML page, as instructed at 334. Controller 330, in accordance with the governing protocol for remote instruction of browser 350, provides a number of abstraction mechanisms so that different web browsers (e.g., Google Chrome, Mozilla Firefox, Internet Explorer, etc.) may be readily controlled programmatically, in response to instructions received at 334. Selenium WebDriver, for example, provides that controller 330 make direct calls to a given browser using that browser's native support for automation.

At 338, confirmation that the web page has been successfully navigated to may be received from browser 350; at 340, this confirmation is, in turn, transmitted by controller 330 to application 310.

With browser 350 having successfully loaded the desired HTML page, at 342, an instruction to retrieve all data of the HTML page (e.g., the entire HTML file) is received from application 310 (e.g., see 318 of FIG. 3B). In variant embodiments, instructions to retrieve a specified portion of the HTML page (e.g., data stored in one or more given HTML tables), rather than all data of the HTML page, may be received at 342. The instruction to retrieve the HTML page (or specific portion thereof, such as data in a particular HTML table for example) is then, at 344, dispatched to browser 350, so as to request the corresponding data from browser 350.

The data requested by controller 330 (i.e., typically the entire HTML file, for subsequent parsing), through remote control of browser 350, is then received at 346, which may then be forwarded to application 310 at 348. In some embodiments, additional processing (e.g., encryption, filtering, authentication, etc.) may be performed prior to and/or during transmission to application 310.

Figure 3D:
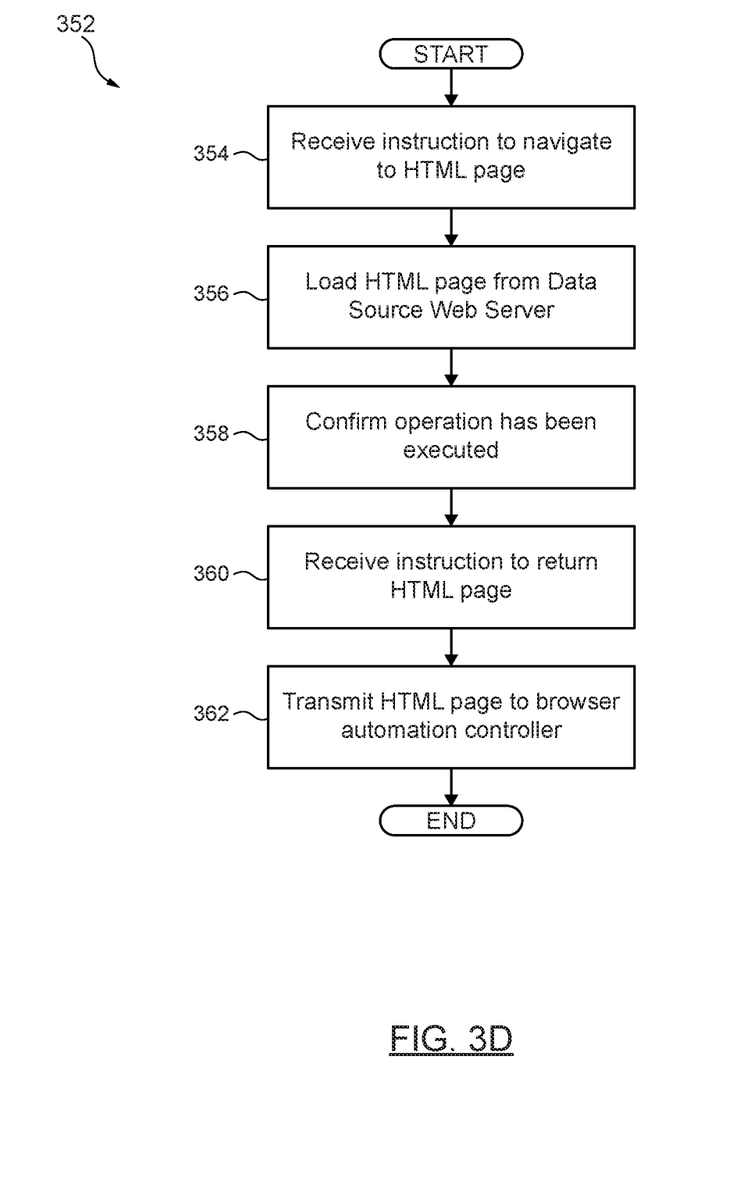
FIG. 3D is a flowchart diagram illustrating acts of a method for retrieving data of a web page in at least one embodiment.

FIG. 3D is a flowchart diagram illustrating acts of a method 352 for retrieving data of a web page in at least one embodiment. Instructions for executing acts of method 352 are performed by an instance of a web browser application, depicted as client browser 350 in FIG. 3A. Certain aspects of browser 350 have been previously described with reference to browser 110 of FIG. 2, and the reader is directed to the description of FIG. 2 for additional detail on browser 110/350. For example, as noted with reference to FIG. 2, the browser is executable on at least one computing device, which in at least one embodiment comprises a hub that is configurable to control a plurality of browser application instances. In a variant embodiment, the browser may comprise a virtual browser.

At 354, browser 350 receives an instruction from controller 330 to navigate to a specified HTML page (e.g., see 336 of FIG. 3C).

At 356, browser 350 loads the specified HTML page from a source, such as a web server (e.g., data source web server 160 of FIG. 2).

At 358, confirmation that the web page has been successfully loaded by browser 350 can be transmitted to controller 330.

At 360, an instruction to transmit the loaded HTML page (or portion thereof, such as data in an HTML table for example) back to controller 330, in accordance with the governing protocol for remote control of browser 350, is then received (e.g., see 344 of FIG. 3C); in response, at 362, the requested data is transmitted to controller 330.

Figure 4:
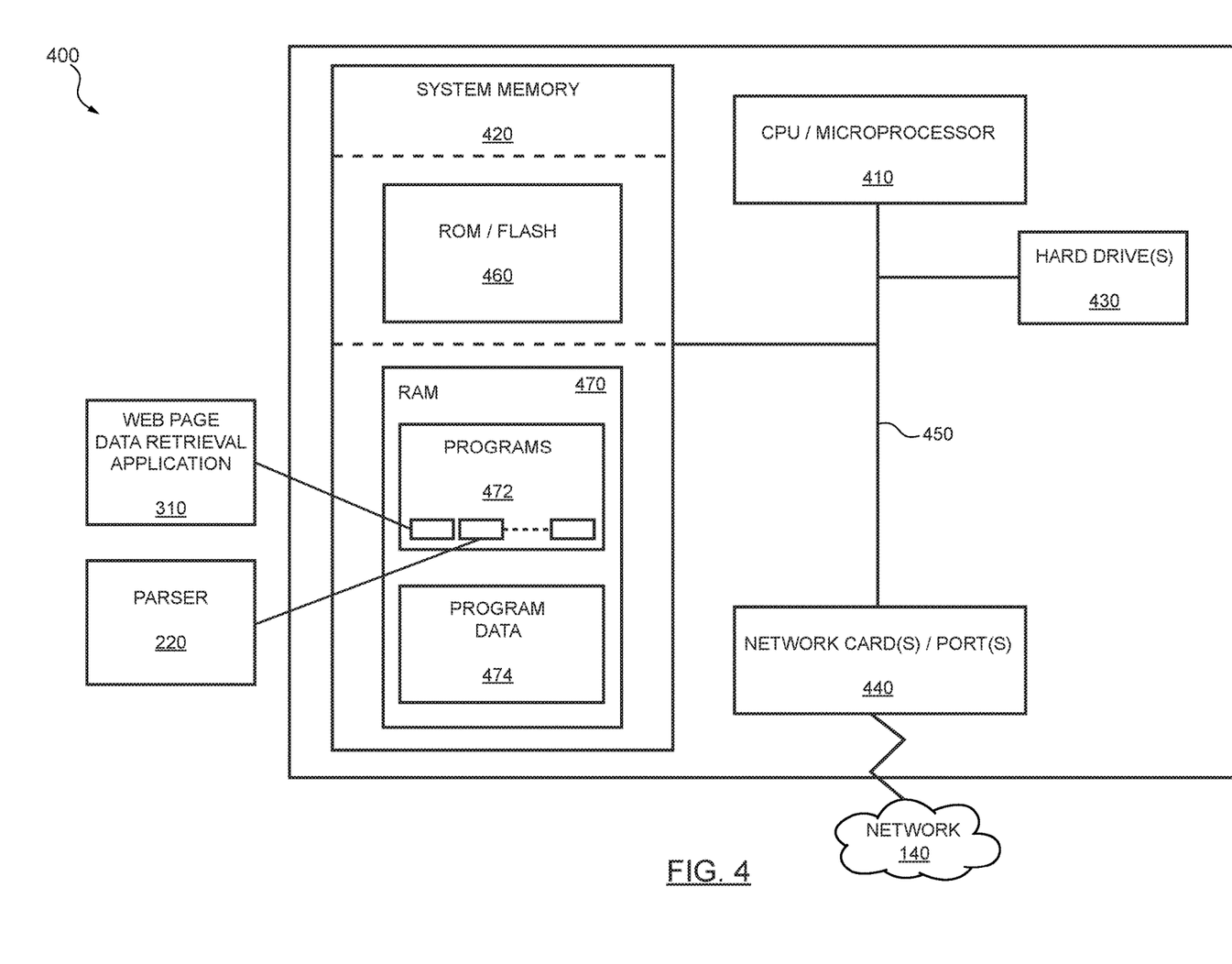
FIG. 4 is a block diagram illustrating components of a computing system in one example implementation.

Referring to FIG. 4, a block diagram illustrating components of a computing system in one example implementation is shown generally as 400. In one example implementation, server 120 (FIG. 2) may comprise some or all of the components of system 400, typically in addition to other components (not shown for brevity) as will be appreciated by persons skilled in the art.

While system 400 may be used to implement the functionality of server 120 in some implementations, the functions of server 120 as described here in may be executed on varying computing devices, including but not limited to: a personal computer, a notebook computer, a tablet computer, a mobile communications device, and/or an electronic device, as examples.

Various implementations of embodiments described herein provide a non-transitory computer-readable medium storing program instructions executable by at least one processor of a computing system to carry out one or more of the methods described herein. In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. Whenever appropriate, "a" computer-readable medium and "the" computer-readable medium may be construed as referring to the same computer-readable medium or to different computer-readable media.

In the example of FIG. 4, system 400 comprises one or more microprocessors or central processing units (CPUs) 410, system memory 420, one or more hard drive(s) 430 and/or other persistent storage devices, and network card(s) and/or port(s) 440, all connected by a system bus 450.

System memory 420 may include a read-only memory (ROM) and/or flash memory 460. System memory 420 may also include random access memory (RAM) 470, which may store instructions for programs 472 and/or program data 474. Programs 472 may include, for example, a web page data retrieval application 310 and parser 220 (also 324 herein), the functions of which have been herein described with reference to a number of example embodiments.

Network card(s) and/or ports 440 provide access to a network 140, allowing system 400 to communicate with other networked devices. In at least one embodiment, the network may be the Internet.

In at least one embodiment described herein, system 400 is communicatively couplable to a hub over network 140 (e.g., to hub 130 of FIG. 2, but not explicitly shown in FIG. 4). Ethernet, WiFi, GSM/LTE, Bluetooth, or other wired, wireless, or cellular protocols may be employed for such communications.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the present description may describe relatively simplified implementations of the embodiments described herein. As persons skilled in the art would understand, variant implementations may be of greater complexity.

In some cases, examples of modifications to embodiments described herein may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of described embodiments, as well as specific examples thereof, are intended to encompass both structural and functional equivalents thereof, whether they are currently known or developed in the future. Thus, for example, although examples have been provided that may describe aspects of a recent or current version of the WebDriver protocol, future versions and/or protocols with similar functionality can be employed in variant embodiments and implementations.

Furthermore, it will be appreciated by those skilled in the art that any block diagrams herein represent conceptual views of illustrative circuitry embodying the principles of the present technology. Similarly, it will be appreciated that any flowcharts, pseudo-code, and the like represent various processes which may be substantially represented in computer-readable media and so executed by a computing device or processor, whether or not such computing device or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU), a graphics processing unit (GPU), a tensor processing unit (TPU), or a processor dedicated to a specific purpose, such as a digital signal processor (DSP). Moreover, explicit use of the term a "processor" and the like should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process acts and/or textual description. Such modules may be executed by hardware that is expressly or implicitly shown in the Figures. Moreover, it should be understood that modules may include for example, but without being limitative, computer program logic, computer program instructions, software, stack, firmware, hardware circuitry, or a combination thereof, which provides the required capabilities.

In variant implementations, some of the acts of one or more embodiments of the methods described herein may be provided as executable instructions stored in transmission media.

While certain methods with respect to certain embodiments have been described and shown with reference to particular acts performed in a particular order, it will be understood that certain acts may be combined, sub-divided, or re-ordered without departing from the teachings herein. Persons skilled in the art will understand that some acts may be executed in series, in parallel, or otherwise concurrently.

As used herein, the wording "and/or" is intended to represent an inclusive-OR. For example, "X and/or Y" is intended to mean X, or Y, or both. As a further example, by extension, "X, Y, and/or Z" is intended to mean X, or Y, or Z, or any combination thereof.

The present disclosure makes references to a number of embodiments. However, it will be understood by persons skilled in the art that other variants and modifications are possible.

What is claimed is:

1. A computer-implemented server for retrieving data of a web page, wherein the web page is retrievable by a browser application instance executable on at least one computing device, wherein the server comprises:
    at least one memory for storing a plurality of instructions, and;
    at least one processor for executing the plurality of instructions to cause a method for retrieving data of the web page to be performed, the method comprising:
        requesting, from the at least one computing device, the data of the web page in accordance with a protocol capable of remotely instructing behavior of the browser application instance;
        in response to the requesting, receiving the data of the web page;
        instructing a server-side parser remote from the browser application instance, to retrieve at least one data item from the data of the web page; and
        transmitting the at least one data item to a requestor,
    wherein the protocol capable of remotely instructing behavior of the browser application instance is provided by a browser remote control interface, and
    wherein the requesting comprises transmitting, to the at least one computing device, at least one command for controlling the browser application instance.

2. The server of claim 1, wherein the at least one computing device is communicatively couplable to the server via at least one network connection.

3. The server of claim 1, wherein the browser remote control interface comprises a WebDriver interface.

4. The server of claim 3, wherein the at least one command comprises at least one WebDriver protocol command.

5. The server of claim 4, wherein the at least one WebDriver protocol command comprises a plurality of Hypertext Transfer Protocol (HTTP) commands.

6. The server of claim 1, wherein the at least one computing device on which the browser application instance is executable comprises a hub, and wherein the hub is configurable to control a plurality of browser application instances.

7. The server of claim 1, wherein the web page comprises a file in a HyperText Markup Language (HTML) format.

8. The server of claim 7, wherein the data of the web page comprises the file in its entirety.

9. The server of claim 7, wherein the file comprises a plurality of Document Object Model (DOM) elements, and wherein the data of the web page is associated with a subset of the plurality of DOM elements.

10. The server of claim 1, wherein the server-side parser is implemented on a same physical device as the server.

11. The server of claim 1, wherein the server-side parser resides on a device communicatively coupled to the server.

12. The server of claim 1, wherein the web page comprises data associated with at least one financial account.

13. The server of claim 12, wherein the web page comprises the data associated with the at least one financial account, represented in a summary format.

14. The server of claim 12, wherein the method further comprises receiving an account verification request from the requestor, and wherein the at least one data item is usable to perform at least one account verification task for the at least one financial account.

15. The server of claim 12, wherein the method further comprises receiving a transaction history request from the requestor, and wherein the at least one data item comprises transactional data for the at least one financial account.

16. The server of claim 12, wherein the method further comprises receiving a customer information request from the requestor, and wherein the at least one data item comprises one or both of: data associated with the at least one financial account, and data associated with an owner of the at least one financial account.

17. A method of retrieving data of a web page,
wherein the web page is retrievable by a browser application instance executable on at least one computing device, wherein the server comprises at least one memory for storing a plurality of instructions, and at least one processor for executing the plurality of instructions to cause the method to be performed, the method comprising:
requesting, from the at least one computing device, the data of the web page in accordance with a protocol capable of remotely instructing behavior of the browser application instance;
in response to the requesting, receiving the data of the web page;
instructing a server-side parser remote from the browser application instance, to retrieve at least one data item from the data of the web page; and
transmitting the at least one data item to a requestor,
wherein the protocol capable of remotely instructing behavior of the browser application instance is provided by a browser remote control interface, and
wherein the requesting comprises transmitting, to the at least one computing device, at least one command for controlling the browser application instance.

18. The method of claim 17, wherein the at least one computing device is communicatively couplable to the server via at least one network connection.

19. A non-transitory computer-readable medium storing instructions that, when executed by at least one processor, cause a method for retrieving data of a web page to be performed, the method comprising:
requesting, from at least one computing device, the data of the web page in accordance with a protocol capable of remotely instructing behavior of a browser application instance that is executable on the at least one computing device;
in response to the requesting, receiving the data of the web page;
instructing a parser remote from the browser application instance, to retrieve at least one data item from the data of the web page; and
transmitting the at least one data item to a requestor,
wherein the protocol capable of remotely instructing behavior of the browser application instance is provided by a browser remote control interface, and
wherein the requesting comprises transmitting, to the at least one computing device, at least one command for controlling the browser application instance.

* * * * *